US012180918B2

(12) United States Patent
Butterweck et al.

(10) Patent No.: US 12,180,918 B2
(45) Date of Patent: Dec. 31, 2024

(54) FUEL INJECTOR

(71) Applicant: BORGWARNER LUXEMBOURG AUTOMOTIVE SYSTEMS SA, Bascharage (LU)

(72) Inventors: Ralf Butterweck, Bitburg (DE); Cas Breedijk, Kanfen (FR); Pierre Balducci, Havange (FR)

(73) Assignee: PHINIA JERSEY HOLDINGS LLC, Wilmington, DE (US)

( * ) Notice: Subject to any disclaimer, the term of this patent is extended or adjusted under 35 U.S.C. 154(b) by 329 days.

(21) Appl. No.: 17/797,518

(22) PCT Filed: Feb. 6, 2021

(86) PCT No.: PCT/EP2021/052892

§ 371 (c)(1),
(2) Date: Aug. 4, 2022

(87) PCT Pub. No.: WO2021/156494

PCT Pub. Date: Aug. 12, 2021

(65) Prior Publication Data

US 2023/0060646 A1 Mar. 2, 2023

(30) Foreign Application Priority Data

Feb. 7, 2020 (GB) .................................... 2001710

(51) Int. Cl.
*F02M 61/10* (2006.01)
*F02M 61/16* (2006.01)

(52) U.S. Cl.
CPC .......... *F02M 61/10* (2013.01); *F02M 61/168* (2013.01); *F02M 2200/8084* (2013.01)

(58) Field of Classification Search
CPC ................. F02M 61/10; F02M 61/168; F02M 2200/8084
See application file for complete search history.

(56) References Cited

U.S. PATENT DOCUMENTS 6,837,449 B2 * 1/2005 Dantes ............... F02M 61/1806 239/585.5
7,021,566 B2 * 4/2006 Dallmeyer ......... F02M 51/0682 239/585.5

(Continued)

FOREIGN PATENT DOCUMENTS

WO 2006114348 A1 11/2006
WO 2015074927 A1 5/2015

OTHER PUBLICATIONS

International Search Report for PCT/EP2021/052892 dated May 4, 2021, 3 pages.

(Continued)

*Primary Examiner* — Xiao En Mo
(74) *Attorney, Agent, or Firm* — WARNER NORCROSS + JUDD LLP

(57) ABSTRACT

An injector comprises a tubular nozzle body having a nozzle side, receiving a needle valve member, and an actuator side, receiving a tubular magnetic armature and receiving an armature side of a tubular pole piece above the magnetic armature, wherein the nozzle body and the pole piece are welded together through a seam weld line between an inner tubular surface of the actuator side of the tubular nozzle body and an outer tubular surface of the armature side of the pole piece. The actuator side of the tubular nozzle body comprises a constricted area while the outer surface of the armature side of the pole piece comprises a recessed area, the constricted area and the recessed area contacting each other at a level of the seam weld line and providing a friction area transmitting hydraulic load away from the seam weld line.

10 Claims, 4 Drawing Sheets

(56) References Cited

U.S. PATENT DOCUMENTS

| | | | | |
|---|---|---|---|---|
| 7,429,006 | B2 * | 9/2008 | Dallmeyer | F02M 61/188 239/585.4 |
| 2002/0047054 | A1 * | 4/2002 | Dallmeyer | F02M 61/18 239/585.4 |
| 2004/0099753 | A1 * | 5/2004 | Reiter | F02M 51/0685 239/585.4 |
| 2009/0184184 | A1 | 7/2009 | Schwegler et al. | |

OTHER PUBLICATIONS

Machine assisted English translation of WO2015074927A1 obtained from https://patents.google.com/patent on Jul. 27, 2022, 5 pages.

* cited by examiner

FUEL INJECTOR

CROSS-REFERENCE TO RELATED APPLICATIONS

This application is the U.S. National Stage of International Application No. PCT/EP2021/052892 filed on 6 Feb. 2021, which claims priority to and all advantages of United Kingdom Application No. 2001710.9 filed on 7 Feb. 2020, the contents of which are incorporated herein by reference.

FIELD OF THE INVENTION

The present invention relates to a fuel injector for an internal combustion engine which is designed to withstand internal gasoline pressure above 300 Bar.

BACKGROUND OF THE INVENTION

Assembly of injectors usually comprises attaching a tubular pole piece and a tubular nozzle body. A first design type, in which an end of the pole piece is received in an end of the nozzle body, uses an annular welding where a continuous annular weld line between an interior surface of the nozzle body and an exterior surface of the pole piece. Welding is done through the tubular nozzle body with a laser beam. Such welding method is referred hereafter as seam weld. In a second type of design, an annular extremity of the nozzle body is butt welded face to face with an annular extremity of the pole piece.

Both welding methods provide a sealed joint between the two parts in order to withstand the gasoline pressure inside the injector. A butt weld is stronger than a seam weld but more difficult to put in practice as the position of the laser that welds the extremities of the two parts must be more accurate.

In gasoline engines, injectors may be maintained by spring compression into the cylinder head and connected to a supply rail through a fluid tight connection with no mechanical locking. The injectors may also be secured to the supply rail and inserted in a bore of the cylinder head without mechanical locking to the cylinder head. In case of a butt weld, the hydraulic load creates a tensile stress on the weld line. In case of a seam weld, the hydraulic load inside the injector provides shear forces on the weld line. Shear forces cause the weld line to be less resistant which reduces the hydraulic pressure that can withstand the seam welded injector compared to the butt welded injector.

In consequence injectors where a seam weld is used to attach the pole piece to the injector body are more limited in pressure than injector where those parts are butt welded. Current designs of seam welded injectors are limited to pressures around 250 bar and cannot be used for high pressure gasoline injection systems such as 350 bar pressure injection systems in particular when the injectors are attached to the injection rail system and received in bores of a cylinder head without being fixed to said cylinder head.

SUMMARY OF THE INVENTION

The present invention intends to increase the pressure that can withstand an injector in which a pole piece and an injector body are seam welded.

More precisely the present invention concerns an injector comprising a tubular nozzle body having a nozzle side, receiving a needle valve member, and an actuator side, receiving a tubular magnetic armature and receiving an armature side of a tubular pole piece above the magnetic armature, in which the nozzle body and the pole piece are welded together through a seam weld line between an inner tubular surface of the actuator side of the tubular nozzle body and an outer tubular surface of said armature side of the pole piece and in which said actuator side of the tubular nozzle body comprises a constricted area while said outer surface of the armature side of the pole piece comprises a recessed area, such constricted area and such recessed area contacting each other at a level of said seam weld line and providing a friction area reducing hydraulic load on said seam weld line.

Provision of said constricted and recessed area at or around the weld line provides retention force around the weld line so that the injector can withstand higher hydraulic pressure inside the injector.

In realization modes which may be separate or combined:

Said recessed area may be formed through a chamfer of said outer surface in an nozzle to inlet axial direction of said tubular pole piece, said tubular pole piece having a diameter decreasing in said nozzle to inlet axial direction.

In an nozzle to inlet axial direction, the armature side of the pole piece may comprise a first diameter providing a contact surface with an inner diameter of said tubular nozzle actuator side and a second diameter above said first diameter, said second diameter being smaller than said first diameter and forming said recessed area.

Said constricted area, provided at the upper end of the actuator side of the tubular nozzle body, may reduce the diameter of the nozzle body towards and up to a top of said actuator side of the nozzle body.

Said constricted area and said recessed area may extend around the seam weld line.

Said seam weld line may be provided at the upper end of the actuator side of the tubular nozzle body and may end said constricted area.

Said seam weld line may be a continuous annular weld line.

The present disclosure concerns also a process for manufacturing an injector as described above, said process comprising applying pressure on at least part of a top end of the nozzle body with a tool adapted to apply a preload on the upper end of the actuator side of the nozzle body while laser welding said nozzle body with said pole piece.

Said tool may press the upper end of the actuator side of the nozzle body to deform the top end of the nozzle body in a centripetal direction into said constricted area until said constricted area contacts said recessed area of the pole piece during laser welding of said nozzle body and said pole piece.

The tool may have a tubular wall provided with an internally conical end pressing said upper end of the actuator side of the nozzle body and wherein the tool, the nozzle body and the pole piece are rotated around a common axis during the laser welding while the beam of the laser is fixed to provide said annular seam weld line and said constricted area contacting said recessed area.

The tool may comprise at least one roller pressing said upper end of the actuator side of the nozzle body while the nozzle body and the pole piece are rotated around a common axis during the laser welding and the beam of the laser is fixed thus providing said annular seam weld line and said constricted area contacting said recessed area. In a preferred mode, the tool comprises three rollers to balance the pressure around the injector.

BRIEF DESCRIPTION OF THE DRAWINGS

A detailed description of exemplary embodiments of the invention will be discussed hereunder in reference to the attached drawings where.

DETAILED DESCRIPTION OF EMBODIMENTS OF THE INVENTION

Figure 1:
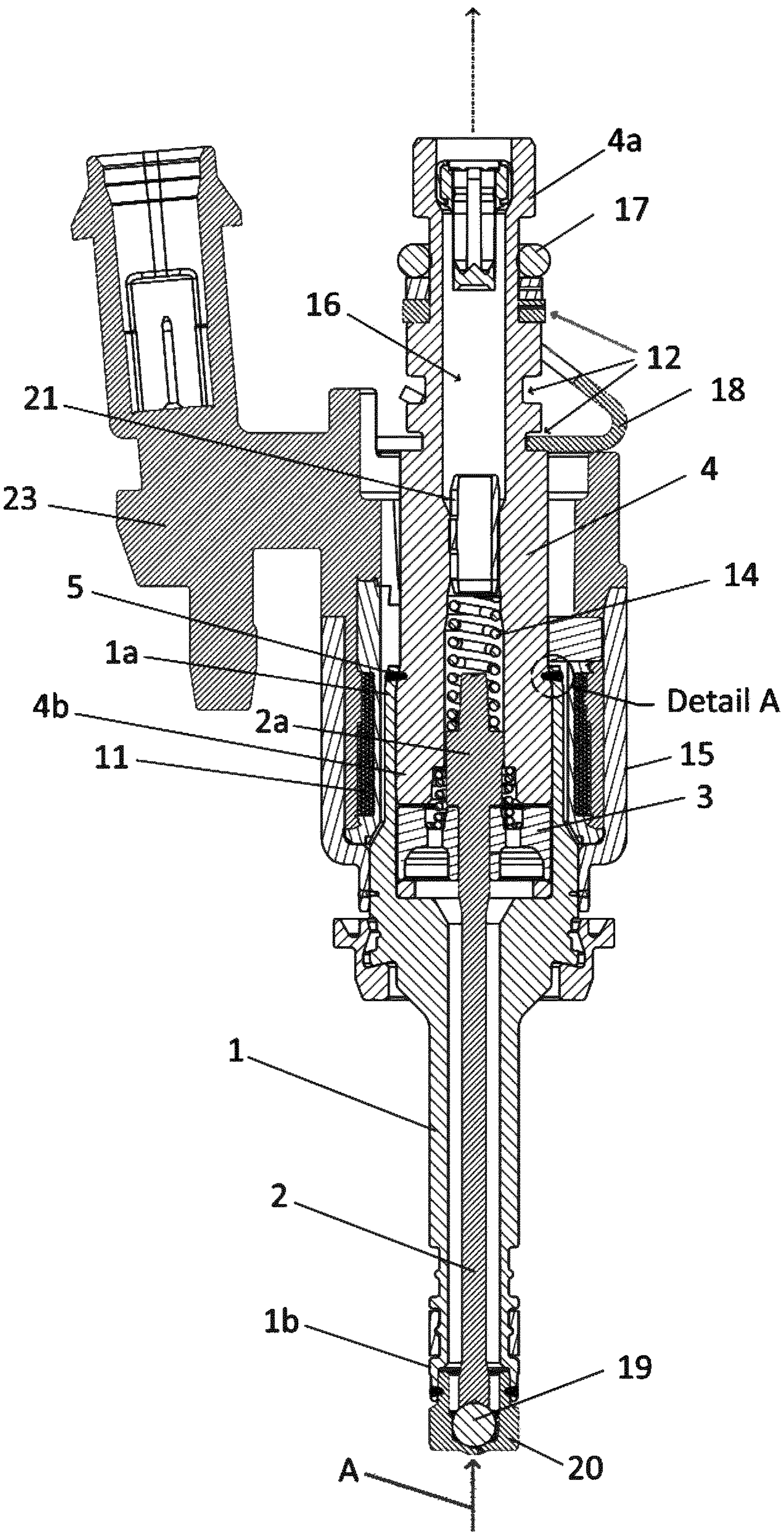
FIG. 1 shows a longitudinal cut view of an injector according to the present disclosure.

The present invention concerns an electromagnetic injector, particularly an injector for a gasoline engine where the injection pressure is within the 200-400 bar range. Such an injector as depicted in the longitudinal cut view of FIG. 1 comprises an electromagnetic actuator having an actuator body 15, a solenoid 11, a tubular magnetic armature 3 and a tubular pole piece 4. The electromagnetic actuator actuates a needle valve member 2 biased by a needle valve member core spring in order to inject gasoline in a cylinder of an engine. The needle valve member and core spring are located within an axial bore 16 of the injector.

The bottom part of the needle valve member is received in a tubular nozzle body 1. The tubular nozzle body has an enlarged upper part or actuator side 1*a* which houses the tubular magnetic armature 3 and a bottom part 4*b* of the pole piece 4. The bottom part of the pole piece houses a head 2*a* of the needle valve member, its core spring 14 and a calibration sleeve 21.

In the described design, the actuator side 1*a* of the nozzle body 1 is surrounded by a solenoid assembly 11. The pole piece 4 comprises an upper part that extends above said intermediate part and provides an inlet for gasoline in the injector. This upper part or inlet side 4*a* of the pole piece is introduced in a distribution tube not represented and receives a sealing gasket 17 to provide a leak-proof fluid connection.

The injector comprises also a sleeve 23 provided with an electrical connector retained by a weld. Another configuration of the pole piece is possible depending on the type of gasoline distribution system.

The inlet side 4*a* of the pole piece 4 may also comprise attachment means to a gasoline distributor circuit such as bores 12.

On the nozzle side 1*b* of the nozzle body, a ball 19 and nozzle 20 are provided under the needle valve member 2.

Such an injector must be leak proof at internal gasoline pressures from 200 bar to around 400 bars. With reference to FIG. 1, the fluid enters in the injector from the inlet side 4*a* of the pole piece, which is the top side of the axial bore 16 in the pole piece. The fluid passes around the needle valve member down to the ball 19 and remains under pressure when the needle valve member is extended under the force of the spring 14. When the needle valve member is retracted when the solenoid 11 is energized, the gasoline exits the injector through the nozzle 20. In the present design, assembly of the pole piece and the nozzle body must withstand the pressure of the gasoline inside the injector that causes a hydraulic load on the interface between such parts.

Assembly of the injector may comprise positioning the tubular magnetic armature 3, the nozzle 20 with the ball 19, the needle valve member 2 in the tubular nozzle body, positioning the pole piece with the needle valve member core spring 14 and calibration sleeve 21 in the pole piece and assembling the equipped pole piece and tubular nozzle body.

Figure 3:
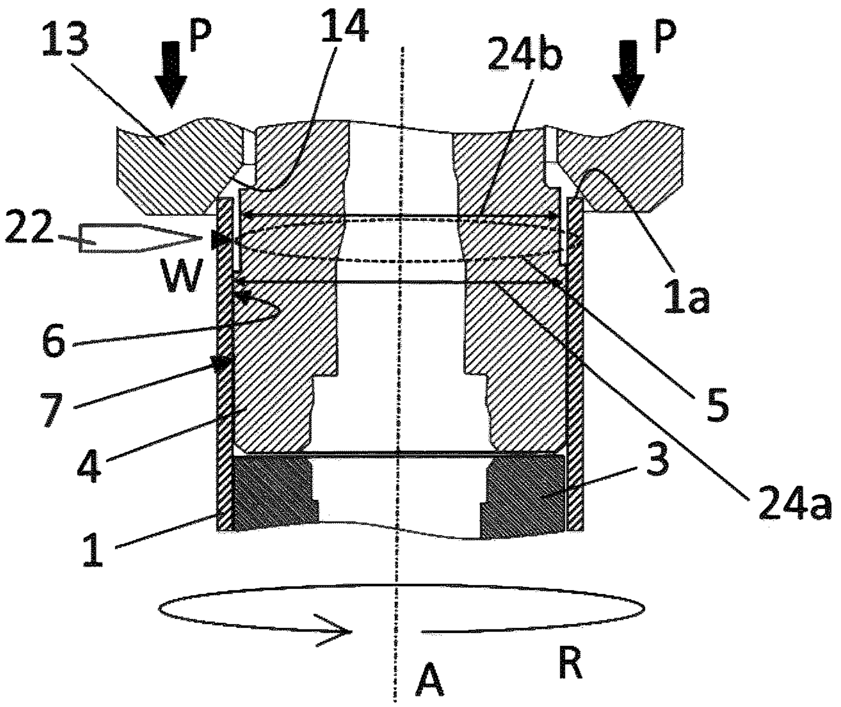
FIG. 3 shows a longitudinal cut view of part of the injector during a first embodiment of a welding process of the disclosure.

Assembling the nozzle body and the pole piece is done at an armature side 4*b* of the pole piece and the actuator side 1*a* of the nozzle body. Such assembly of the actuator side 1*a* of the tubular nozzle body 1 and the armature side 4*b* of the pole piece 4 is done by welding these parts together as schematically represented on FIG. 3 showing a simplified cut view of the welding area. Welding is a laser beam welding W in which the nozzle body and pole piece are rotated around a common axis A in front of a fixed laser 22 thus providing a seam weld line 5 which may be a continuous weld line and preferably an annular weld line.

Figure 4:
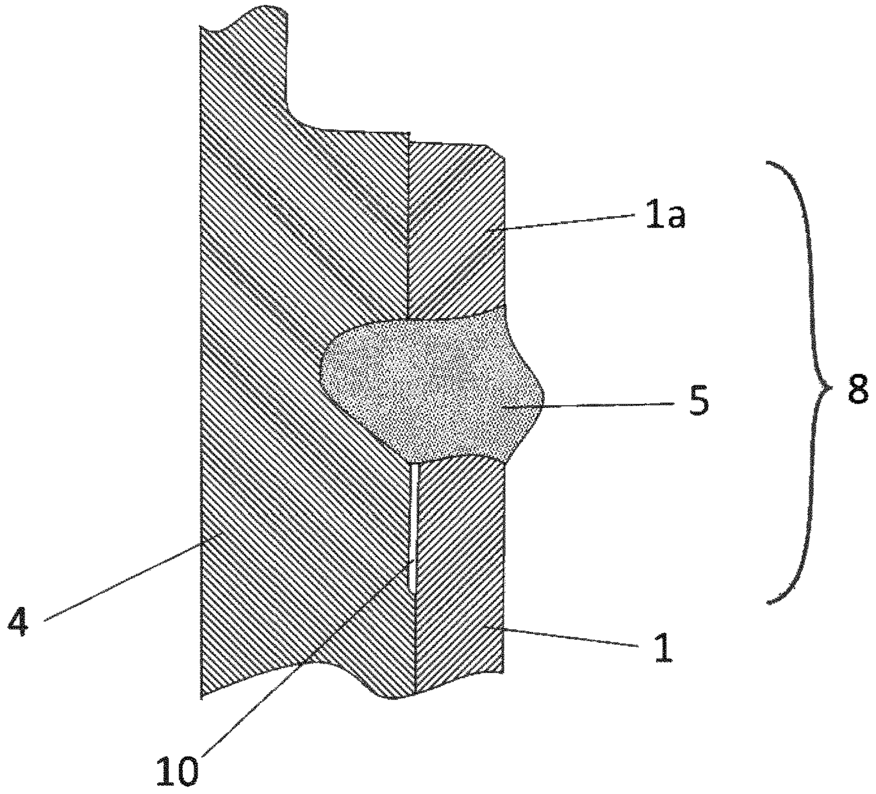
FIG. 4 shows a microscope view of a cut at the seam weld joint level.

FIG. 4 shows a microscope view of a cut of the material at the weld line 5 level between an inner tubular surface 6 of the tubular nozzle body in the vicinity of the actuator side 1*a* of the tubular nozzle body and an outer tubular surface 7 of said armature side 4*b* of the pole piece 4.

According to the disclosure, the upper end, or actuator side 1*a*, of the tubular nozzle body comprises a constricted area 8 while said outer surface of the bottom part, or armature side 4*b*, of the pole piece comprises a recessed area.

By constricted area is meant a part of the tubular body having outer and internal reduced diameters. In the examples of FIGS. 2B and 2D this constricted area is an annular area located around the weld line between the pole piece and the nozzle body where the tubular nozzle body has a reduced diameter. In the example of FIG. 2E the constricted area starts under the weld line and ends with the weld line.

By recessed area is meant a part of the outer surface of the pole piece with a locally decreasing diameter or a diameter at least locally reduced.

Figure 2A:
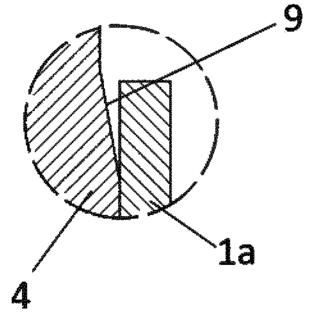
FIG. 2A shows a detail of a first embodiment prior to welding.
Figure 2B:
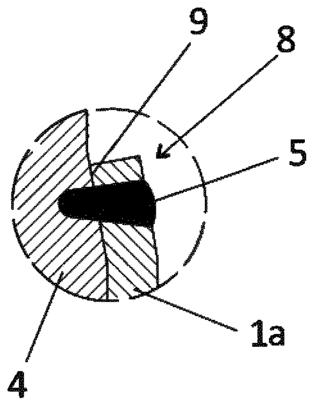
FIG. 2B shows the embodiment of FIG. 2A after welding.
Figure 2C:
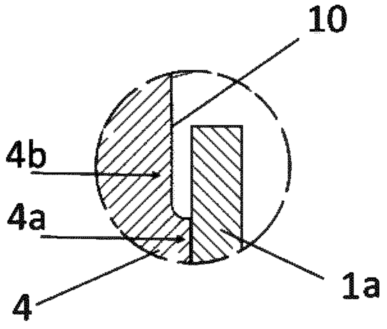
FIG. 2C shows a detail of a second embodiment prior to welding.
Figure 2D:
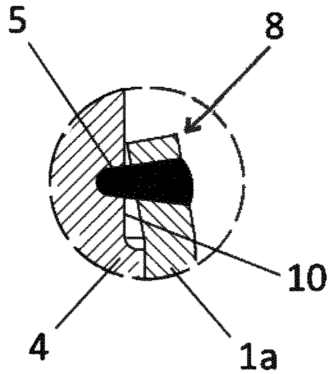
FIG. 2D shows the embodiment of FIG. 2C after welding.
Figure 2E:
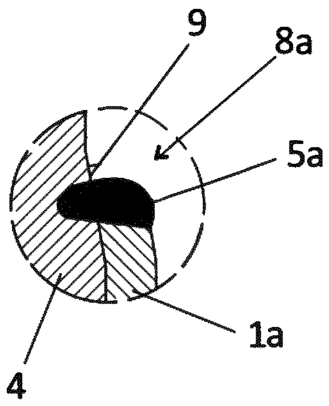
FIG. 2E shows a detail of a third embodiment after welding.

FIGS. 2A and 2C show two possible types of recessed areas 9, 10 of the welding zone of the pole piece.

In FIG. 2A, the recessed area is formed with a chamfer 9 on the outer surface of the pole piece in the welding zone and in FIG. 2C the recessed area is done with a reduced diameter area of outer tubular surface of the pole piece 4 in the welding zone.

On the tubular nozzle body side, the upper end of the actuator side 1*a* of the nozzle body is straight before welding in FIGS. 2A, 2C and is curved after welding as shown in FIGS. 2B, 2D. This provides a constricted area 8 such that the constricted area 8 and recessed area 9, 10 surround the seam weld line 5, contact each other and provide a friction area. This friction area transmits the hydraulic load or pressure inside the injector away from the seam weld line which allows a higher fluid pressure in the injector and the injection circuit while the weld line provides leak proof sealing of the injector.

With this configuration, the allowable pressure may be increased above 350 bars while a similar injector without such a friction area is usually limited to around 250 bars.

In the following paragraph, the injector is viewed as in FIG. 1 with its nozzle side at the bottom and its inlet side at the top. The words bottom, under and top, above refer to such orientation.

Back to FIG. 2A, the chamfer 9 of the outer tubular surface starts under the seam weld line and ends above the seam weld line in a longitudinal axial direction A of said tubular pole piece represented in FIG. 3, said tubular pole piece having a diameter decreasing in a bottom-up direction (that is nozzle side to inlet side direction) around the annular weld line.

Back to FIG. 2C in correspondence with FIG. 3, the pole piece comprises, under the seam weld line, a first diameter 4*a*, said first diameter providing a contact surface with an inner diameter of said tubular nozzle actuator side and a second diameter 4*b* above said first diameter, said second diameter being smaller than said first diameter and forming said recessed area 10. Here also, the recessed area extends from under the seam weld line to above said weld line.

With this design, the constricted area 8 provided at the upper end of the actuator side 1*a* of the tubular nozzle body reduces the diameter of the nozzle body towards and up to said upper end.

This design is particularly interesting when the injector is "hanging" from the gasoline distribution system which means that the injector is fixed to the gasoline distribution system and that the nozzle side 1*b* of the nozzle body is inserted in a bore of the cylinder head without axial locking. In such a case, the internal pressure in the injector is not counterbalanced by such an axial locking.

In order to provide the constricted area, a method used in the present disclosure comprises applying a preload P on the upper end of the actuator side 1*a* of the nozzle body with a tool 13.

In a first embodiment of the present disclosure, as described in FIG. 3, the tool has a tubular wall provided with an internally conical end 14 adapted to press on the upper end of the nozzle body on the actuator side 1*a* in order to provide a preload of about 150 to 250 Newton and preferably around 200 Newton during the laser welding W of the nozzle body with the pole piece.

The internal conical end pressing said upper end of the nozzle body in a centripetal direction during laser welding W of said nozzle body and said pole piece. This deforms the top end of the nozzle body into said constricted area contacting said recessed area of the pole piece.

As the parts are rotated in front of the welding laser 22 around axis A, the tool 13 is rotated together with the welded parts to avoid friction with the nozzle body. The preload is preferably maintained until the weld line is finished. Such pressure together with the laser welding heat creates the constricted area of the end of the tubular nozzle body.

With such process, a nozzle body end having a relatively thick wall, e.g. a wall having a thickness between 0.45 mm and 1.0 mm depending on the material strength may be constricted without deteriorating the weld line between the nozzle body and the pole piece.

Figure 6:
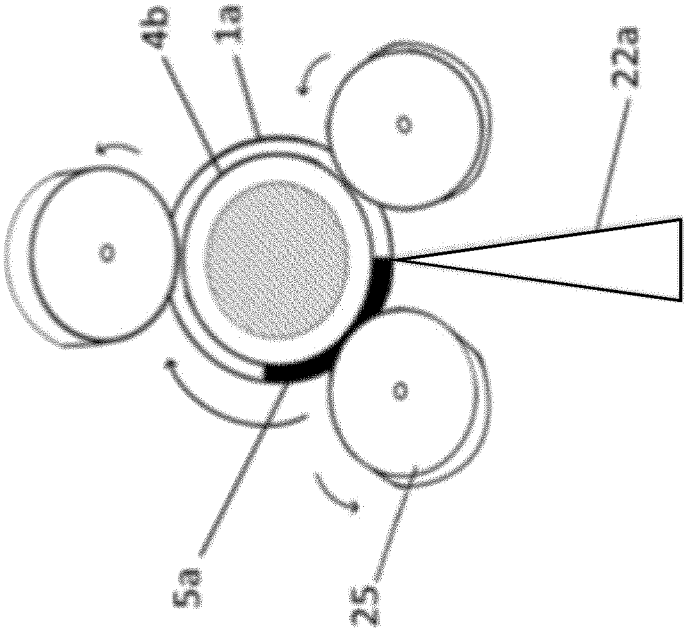
FIG. 6 shows a schematic view from the top of part of an injector during a the welding process of FIG. 5.
Figure 5:
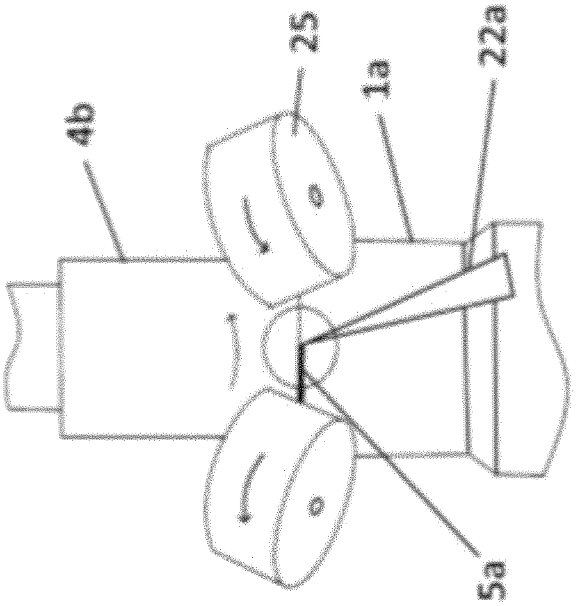
FIG. 5 shows a schematic side view of part of an injector during a second embodiment of a welding process of the disclosure.

In another embodiment as per FIGS. 5 and 6, the tool comprises rollers 25 separated with gaps to provide a passageway for a laser beam 22*a*. This embodiment with rollers is used when a simple tool as described above would cover the area that should be welded. This is the case with a weld near the edge or at the edge of the upper side of the tubular nozzle body.

The gaps separating the rollers permit to direct the laser beam towards the upper end of actuator side 1*a* of the tubular nozzle body. This allows welding the pole piece and nozzle body at the upper end of the nozzle body as shown in FIG. 2E. In the embodiment shown, the recessed area of the pole piece is a chamfer as in FIG. 2A but could be a reduced diameter as in FIG. 2C. The constricted area 8*a* starts under the weld line and ends with the weld line 5*a* and the friction area between the tubular nozzle body and the pole piece ends with the weld line.

In this embodiment, the laser is fixed and the injector parts turn which cause the rollers 25 to apply pressure on the heated seam weld line 5*a* while rolling on the edge of the upper end of the tubular nozzle body. Such pressure combined with the welding heat causes the upper end of the tubular nozzle body to deform and create the constricted area.

The rollers are made of a hard material such as steel or a material such as ceramics to limit heat losses at the contact point with the edge of the nozzle body upper end.

The invention is not limited to the above described examples and in particular the configuration of the solenoid 11, its housing and/or the sleeve 23 may depart from the example shown. In particular while the description refers to laser welding, the welding process may use an electron beam welding process which also permits to weld parts positioned side by side.

LIST OF REFERENCES

1—Tubular nozzle body
1*a*—Actuator side of tubular nozzle body
1*b*—Nozzle side of tubular nozzle body
2—Needle valve member
2*a*—Head of the needle valve member
3—Tubular magnetic armature
4—Pole piece
4*a*—Inlet side of the pole piece
4*b*—Armature side of the pole piece
5—Seam weld line
5*a*—End seam weld line
6—Inner tubular surface of the tubular nozzle body
7—Outer tubular surface of said bottom part
8, 8*a*—Constricted area
9, 10—Recessed areas
11—Solenoid
12—bores
13—Tool
14—Needle valve member core spring
15—Actuator body
16—Axial bore
17—Sealing gasket
18—Spring clip
19—Ball
20—Nozzle
21—Calibration sleeve
22—Welding laser
22*a*—Laser beam
23—Sleeve
24*a*—First diameter
24*b*—Second diameter
25—Roller
A—Common axis
P—Preload
R—Rotation
W—Welding

The invention claimed is:

1. An injector comprising a tubular nozzle body having a nozzle side, receiving a needle valve member, and an actuator side, receiving a tubular magnetic armature and receiving an armature side of a tubular pole piece above the magnetic armature, wherein the nozzle body and the pole piece are welded together through a seam weld line between an inner tubular surface of the actuator side of the tubular nozzle body and an outer tubular surface of the armature side of the pole piece, wherein the actuator side of the tubular nozzle body comprises a constricted area while the outer surface of the armature side of the pole piece comprises a recessed area, the constricted area and the recessed area contacting each other at a level of the seam weld line and providing a friction area reducing hydraulic load on the seam weld line.

2. The injector according to claim 1, wherein the recessed area is formed through a chamfer of the outer surface in an nozzle to inlet axial direction of the tubular pole piece, the tubular pole piece having a diameter decreasing in the nozzle to inlet axial direction.

3. The injector according to claim 1, wherein in an nozzle to inlet axial direction the armature side of the pole piece comprises a first diameter providing a contact surface with an inner diameter of the tubular nozzle actuator side and a second diameter above the first diameter, the second diameter being smaller than the first diameter and forming the recessed area.

4. The injector according to claim 1, wherein the constricted area, provided at the upper end of the actuator side of the tubular nozzle body, reduces the diameter of the nozzle body towards and up to a top of the actuator side of the nozzle body.

5. The injector according to claim 4, wherein the constricted area and the recessed area extend around the seam weld line.

6. The injector according to claim 4, wherein the seam weld line is provided at the upper end of the actuator side of the tubular nozzle body and ends the constricted area.

7. The injector according to claim 1 wherein the seam weld line is a continuous annular weld line.

8. A process for manufacturing the injector according to claim 1, the method comprising applying pressure on the top end of the nozzle body with a tool adapted to apply a preload on the upper end of the actuator side of the nozzle body while laser welding the nozzle body with the pole piece, the tool pressing the upper end of the actuator side of the nozzle body to deform the top end of the nozzle body in a centripetal direction into the constricted area until the constricted area contacts the recessed area of the pole piece during laser welding of the nozzle body and the pole piece.

9. The process for manufacturing an injector according to claim 8, wherein the tool has a tubular wall provided with an internally conical end pressing the upper end of the actuator side of the nozzle body and wherein the tool, the nozzle body and the pole piece are rotated around a common axis during the laser welding while the beam of the laser is fixed to provide the annular seam weld line and the constricted area contacting the recessed area.

10. The process for manufacturing an injector according to claim 8, wherein the tool comprises at least one roller pressing the upper end of the actuator side of the nozzle body while the nozzle body and the pole piece are rotated around a common axis during the laser welding and the beam of the laser is fixed thus providing the annular seam weld line and the constricted area contacting the recessed area.

* * * * *